(12) United States Patent
Kawai

(10) Patent No.: US 10,330,146 B2
(45) Date of Patent: Jun. 25, 2019

(54) RETAINER AND TAPERED ROLLER BEARING

(71) Applicant: NTN CORPORATION, Osaka (JP)

(72) Inventor: Takashi Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/755,158

(22) PCT Filed: Aug. 24, 2016

(86) PCT No.: PCT/JP2016/074688
§ 371 (c)(1),
(2) Date: Feb. 26, 2018

(87) PCT Pub. No.: WO2017/033977
PCT Pub. Date: Mar. 2, 2017

(65) Prior Publication Data
US 2018/0245627 A1    Aug. 30, 2018

(30) Foreign Application Priority Data

Aug. 27, 2015   (JP) .................. 2015-167680

(51) Int. Cl.
*F16C 19/36*    (2006.01)
*F16C 33/36*    (2006.01)
(Continued)

(52) U.S. Cl.
CPC ............ *F16C 19/364* (2013.01); *F16C 33/36* (2013.01); *F16C 33/366* (2013.01);
(Continued)

(58) Field of Classification Search
CPC ........ F16C 19/364; F16C 33/36; F16C 33/46; F16C 33/54; F16C 33/4676;
(Continued)

(56) References Cited

U.S. PATENT DOCUMENTS 3,133,770 A * 5/1964 Cowles ................. F16C 33/543
  384/575
3,940,193 A * 2/1976 Molloy ............... F16C 33/4605
  384/580

(Continued)

FOREIGN PATENT DOCUMENTS

DE        4338350 A1 *  5/1995  ............ F16C 19/364
DE   102006032750 B4 * 10/2017  ............ F16C 33/543
(Continued)

OTHER PUBLICATIONS

International Preliminary Report on Patentability dated Feb. 27, 2018 in International (PCT) Application No. PCT/JP2016/074688
(Continued)

*Primary Examiner* — Marcus Charles
(74) *Attorney, Agent, or Firm* — Wenderoth, Lind & Ponack, L.L.P.

(57) ABSTRACT

A retainer of a tapered roller bearing includes crossbars having guide surfaces which circumferentially contact the tapered rollers. The crossbars are also formed with first recessed surfaces and second recessed surfaces which are both in the form of cutouts circumferentially recessed from the respective guide surfaces to reduce stirring resistance and shear resistance of oil. To reduce the contact lengths between the rolling surface central portions of the tapered rollers and the guide surfaces, the guide surfaces are smoothly convex in the longitudinal direction of the tapered rollers.

20 Claims, 17 Drawing Sheets

(51) Int. Cl.
*F16C 33/46* (2006.01)
*F16C 33/54* (2006.01)

(52) U.S. Cl.
CPC .......... *F16C 33/4676* (2013.01); *F16C 33/54* (2013.01); *F16C 2240/30* (2013.01); *F16C 2240/40* (2013.01); *F16C 2240/50* (2013.01)

(58) Field of Classification Search
CPC .............. F16C 2240/40; F16C 2240/70; F16C 2240/30; F16C 2240/50
USPC ........ 384/565, 568, 571–572, 576, 578, 575
See application file for complete search history.

(56) References Cited

U.S. PATENT DOCUMENTS

| | | | | |
|---|---|---|---|---|
| 4,317,601 A | * | 3/1982 | Faigley, Jr. | F16C 19/364 384/576 |
| 4,403,813 A | * | 9/1983 | Schaefer | F16C 33/467 384/450 |
| 4,664,537 A | * | 5/1987 | Ascheron | F16C 19/364 384/470 |
| 7,918,607 B2 | * | 4/2011 | Beluffi | F16C 19/364 384/470 |
| 2007/0014501 A1 | * | 1/2007 | Ueno | F16C 33/543 384/571 |
| 2010/0002975 A1 | * | 1/2010 | Ueno | F16C 19/364 384/571 |
| 2011/0123143 A1 | * | 5/2011 | Lee | F16C 33/6681 384/572 |
| 2012/0033909 A1 | | 2/2012 | Fujiwara | |
| 2014/0169720 A1 | * | 6/2014 | Durney | F16C 33/6629 384/578 |
| 2014/0254971 A1 | | 9/2014 | Shimizu | |

FOREIGN PATENT DOCUMENTS

| | | | | |
|---|---|---|---|---|
| EP | 1757823 A2 | * | 2/2007 | ............ F16C 19/364 |
| EP | 2 865 910 | | 4/2015 | |
| JP | 53-057148 | | 5/1978 | |
| JP | 2007-024170 | | 2/2007 | |
| JP | 2007-078147 | | 3/2007 | |
| JP | 2007315552 A | * | 12/2007 | ............ F16C 33/565 |
| JP | 4651578 B2 | * | 3/2011 | ............ F16C 33/565 |
| JP | 4949652 | | 6/2012 | |
| JP | 4949652 B2 | * | 6/2012 | ............ F16C 33/543 |
| JP | 2013-079706 | | 5/2013 | |
| JP | 5334665 | | 11/2013 | |
| JP | 2014-005846 | | 1/2014 | |
| JP | 2015-059648 | | 3/2015 | |

OTHER PUBLICATIONS

International Search Report dated Nov. 15, 2016 in International (PCT) Application No. PCT/JP2016/074688.

* cited by examiner

RETAINER AND TAPERED ROLLER BEARING

TECHNICAL FIELD

This invention relates to a retainer formed with pockets for receiving tapered rollers, and a tapered roller bearing including such a retainer.

BACKGROUND ART

During operation of a tapered roller bearing, oil passing through the bearing is stirred by e.g., the rolling tapered rollers, and the stirring resistance of oil tends to increase rotation torque of the bearing. The crossbars of the retainer have guide surfaces that are circumferentially brought into contact with the tapered rollers in the pockets. This increases the shear torque (or shear resistance) of oil between the tapered rollers and the guide surfaces. The increase in such shear resistance also tends to increase rotation torque of the bearing. Trials have heretofore been made to reduce rotation torque of the bearing by modifying the shape of the retainer.

For example, in order to reduce the shear resistance of oil by reducing the amount of oil flowing into the bearing, one conventional retainer is shaped such that a smaller radial gap is defined between the radially inner surface of the retainer and the small flange of the inner race. Some other conventional retainers have recesses in the shape of cutouts formed in the annular portion of the retainer on its small-diameter side to allow oil that has flowed through a gap between the retainer and the inner race into the space between the retainer and the inner race to quickly flow into the space between the retainer and the outer race, thereby reducing the stirring resistance of oil. Still another conventional retainer has recessed surfaces in the form of cutouts formed in the crossbars between the respective guide surfaces and first axial ends of the crossbars and between the respective guide surfaces and second opposite axial ends of the crossbars, to reduce the shear resistance of oil between the tapered rollers and the crossbars (see Japanese Patent 4949652).

Yet another conventional retainer has crossbars formed with guide surfaces each of which is tapered, and has a length of not less than 5% and not more than 20% of the average diameter of the corresponding tapered roller, in a plane perpendicular to the center axis of the tapered roller, to reduce the oil film forming area, and thus the shear resistance of oil between the tapered rollers and the crossbars (see Japanese Patent Publication 2007-24170A).

In another conventional arrangement, in order to reduce stress concentration at the ends of the rolling surfaces of the tapered rollers to withstand further heavy loads, the rolling surfaces have crowning. Especially the combination of tapered rollers having logarithmic large crowning, and raceways having straight or convex crowning is advantageous in bearing function and processing cost. In an arrangement in which logarithmic crowning is used, each tapered roller may have a rolling surface central portion formed at the central portion of the entire length of the tapered roller, and having a straight generating line; and crowning portions each extending from one end of the rolling surface central portion such that its diameter gradually decreases in the direction away from the one end of the rolling surface central portion. In this arrangement, since the rolling surface central portion having a straight generating line is used as a reference in measuring the logarithmic crowning portions, stable quality control is possible (see Japanese Patent 5334665).

If a retainer having the recessed surfaces disclosed in Japanese Patent 4949652 or the guide surfaces disclosed in Japanese Patent Publication 2007-24170A is combined with tapered rollers disclosed in Japanese Patent 5334665, the guide surfaces which are straight in the longitudinal direction of the crossbars will circumferentially contact the rolling surface central portions having straight generating lines and formed at the central portions of the entire length of the respective tapered rollers. Therefore, the contact lengths between the guide surfaces and the tapered rollers are large compared with bearings including tapered rollers having general crowning with circular arc-shaped generating lines. This makes it difficult to effectively reduce the bearing rotation torque.

SUMMARY OF THE INVENTION

An object of the present invention is therefore to provide a retainer which can effectively reduce the bearing rotation torque when this retainer is used in combination with tapered rollers each having a rolling surface central portion having a straight generating line and formed at the central portion of the entire length of the tapered roller.

In order to achieve this object, the present invention provides, from a first aspect, a retainer formed with pockets configured to each receive one of a plurality of tapered rollers, wherein the retainer comprises: a plurality of crossbars separating circumferentially adjacent pairs of the pockets from each other; a first annular portion continuously connected to first axial ends of the crossbars; and a second annular portion having an outer diameter larger than the outer diameter of the first annular portion, and continuously connected to second axial ends of the crossbars which are opposite from the first axial ends of the crossbars. Each crossbar includes: guide surfaces configured to circumferentially contact the corresponding tapered rollers; first recessed surfaces in the form of cutouts each located between the respective guide surface and the first axial end of the crossbar, and circumferentially recessed from the respective guide surface; and second recessed surfaces in the form of cutouts each located between the respective guide surface and the second axial end of the crossbar, and circumferentially recessed from the respective guide surface. The guide surfaces are smoothly convex in the longitudinal direction of the tapered rollers, and each tapered roller includes a rolling surface central portion located at the central portion of the entire length of the tapered roller, and having a straight generating line, and crowning portions each extending from one end of the rolling surface central portion such that its diameter gradually decreases in the direction away from the one end. Each guide surface has a protruding portion having a maximum protruding amount toward the rolling surface central portion of the corresponding tapered roller, the protruding portion being shorter, in the longitudinal direction of the tapered roller, than the rolling surface central portion of the tapered roller.

In order to achieve the above object, the present invention provides, from a second aspect, a retainer formed with pockets configured to each receive one of a plurality of tapered roller. The retainer comprises: a plurality of crossbars separating circumferentially adjacent pairs of the pockets from each other; a first annular portion continuously connected to first axial ends of the crossbars; and a second annular portion having an outer diameter larger than the outer diameter of the first annular portion, and continuously connected to second axial ends of the crossbars which are opposite from the first axial ends of the crossbars. The crossbars have guide surfaces configured to circumferentially contact the corresponding tapered rollers, and the first annular portion includes pocket end surfaces each configured to axially contact the respective tapered roller, and third recessed surfaces in the form of cutouts each axially recessed from the respective pocket end surface. Each third recessed surface is located at a circumferentially central portion between a respective circumferentially adjacent pair of the crossbars. The guide surfaces are smoothly convex in the longitudinal direction of the tapered rollers, and each tapered roller includes a rolling surface central portion located at the central portion of the entire length of the tapered roller, and having a straight generating line, and crowning portions each extending from one end of the rolling surface central portion such that its diameter gradually decreases in the direction away from the one end. Each guide surface has a protruding portion having a maximum protruding amount toward the rolling surface central portion of the corresponding tapered roller, the protruding portion being shorter, in the longitudinal direction of the tapered roller, than the rolling surface central portion of the tapered roller.

In order to achieve the above object, the present invention provides, from a third aspect, a retainer formed with pockets configured to each receive one of a plurality of tapered rollers. The retainer comprises: a plurality of crossbars separating circumferentially adjacent pairs of the pockets from each other; a first annular portion continuously connected to first axial ends of the crossbars; and a second annular portion having an outer diameter larger than the outer diameter of the first annular portion, and continuously connected to second axial ends of the crossbars which are opposite from the first axial ends of the crossbars. The crossbars have guide surfaces configured to circumferentially contact the corresponding tapered rollers, and each guide surface is tapered and has a length which is not less than 5% and not more than 20% of the average diameter of the corresponding tapered roller, in a plane perpendicular to the center axis of the tapered roller. The guide surfaces are smoothly convex in the longitudinal direction of the tapered rollers.

Advantages of the Invention

In the first aspect of the invention, the first recessed surfaces of the crossbars allow oil that has flowed through the gap between the retainer and the inner race into the space between the retainer and the inner race to quickly flow into the space between the retainer and the outer race, thereby reducing the stirring resistance of oil. The combination of the first recessed surfaces and the second recessed surfaces of the crossbars reduces shear resistance of oil between the tapered rollers and the guide surfaces. The use of the convex guide surfaces, in combination with tapered rollers each including a rolling surface central portion having a straight generating line and located at the central portion of the entire length of the tapered roller, reduces the contact lengths between the guide surfaces and the tapered rollers, thereby reducing the bearing rotation torque.

In the second aspect of the invention, the third recessed surfaces of the first annular portion allow oil that has flowed through the gap between the retainer and the inner race into the space between the retainer and the inner race to quickly flow into the space between the retainer and the outer race, thereby reducing the stirring resistance of oil. Further, the use of the convex guide surfaces, in combination with tapered rollers each including a rolling surface central portion having a straight generating line and located at the central portion of the entire length of the tapered roller, reduces the contact lengths between the guide surfaces and the tapered rollers, thereby reducing the bearing rotation torque.

In a third aspect of the invention, since each guide surface is tapered, and has a length of not less than 5% and not more than 20% of the average diameter of the corresponding tapered roller, in a plane perpendicular to the center axis of the tapered roller, the oil film forming area is small, so that the shear resistance of oil between the tapered rollers and the crossbars is also small. Further, the use of the convex guide surfaces, in combination with tapered rollers each including a rolling surface central portion having a straight generating line and located at the central portion of the entire length of the tapered roller, reduces the contact lengths between the guide surfaces and the tapered rollers, thereby reducing the bearing rotation torque.

DETAILED DESCRIPTION OF THE INVENTION

Figure 2:
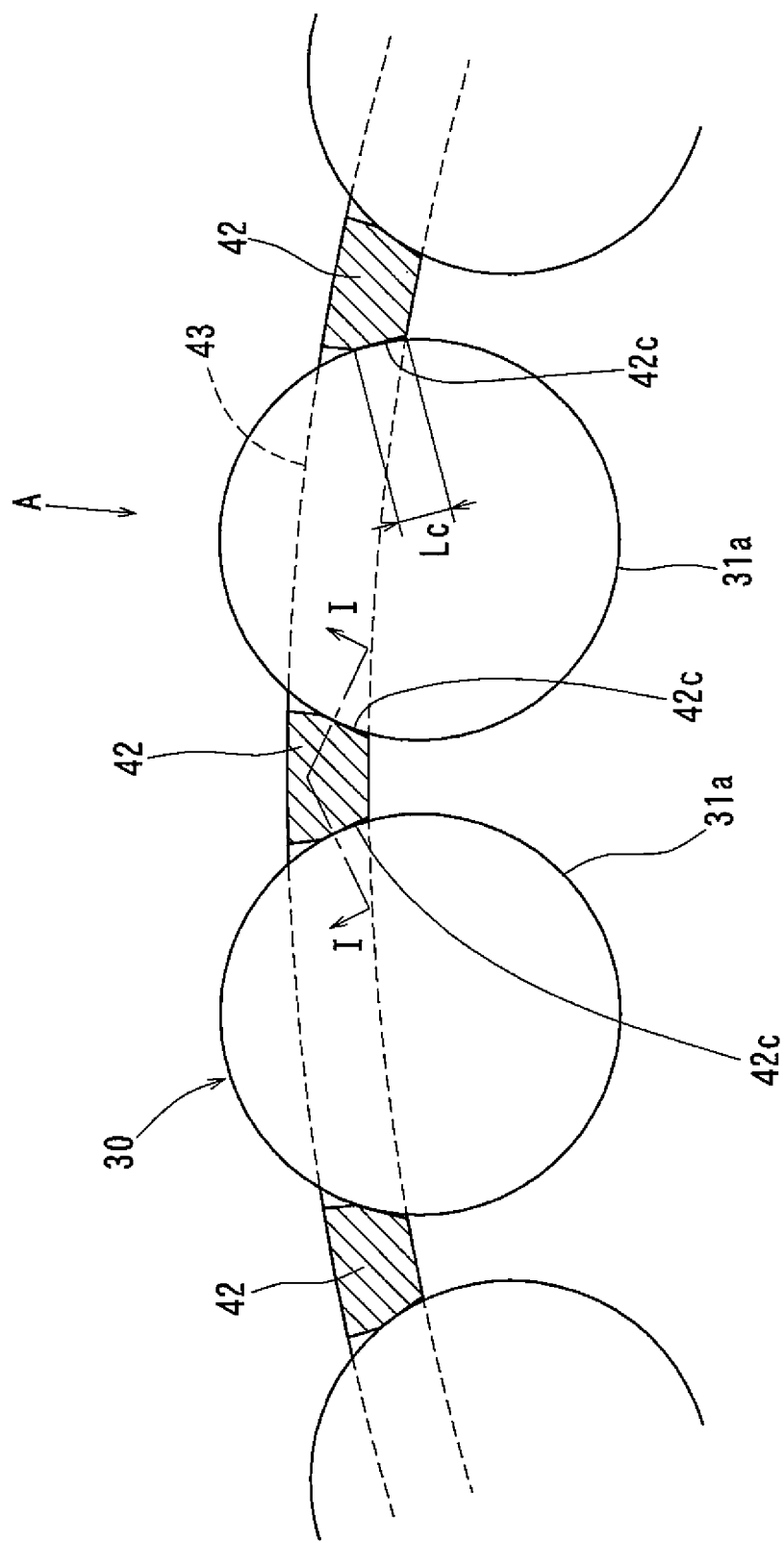
FIG. 2 is a partial enlarged sectional view of the first embodiment of the present invention, taken along a plane perpendicular to the center axes of tapered rollers.
Figure 3:
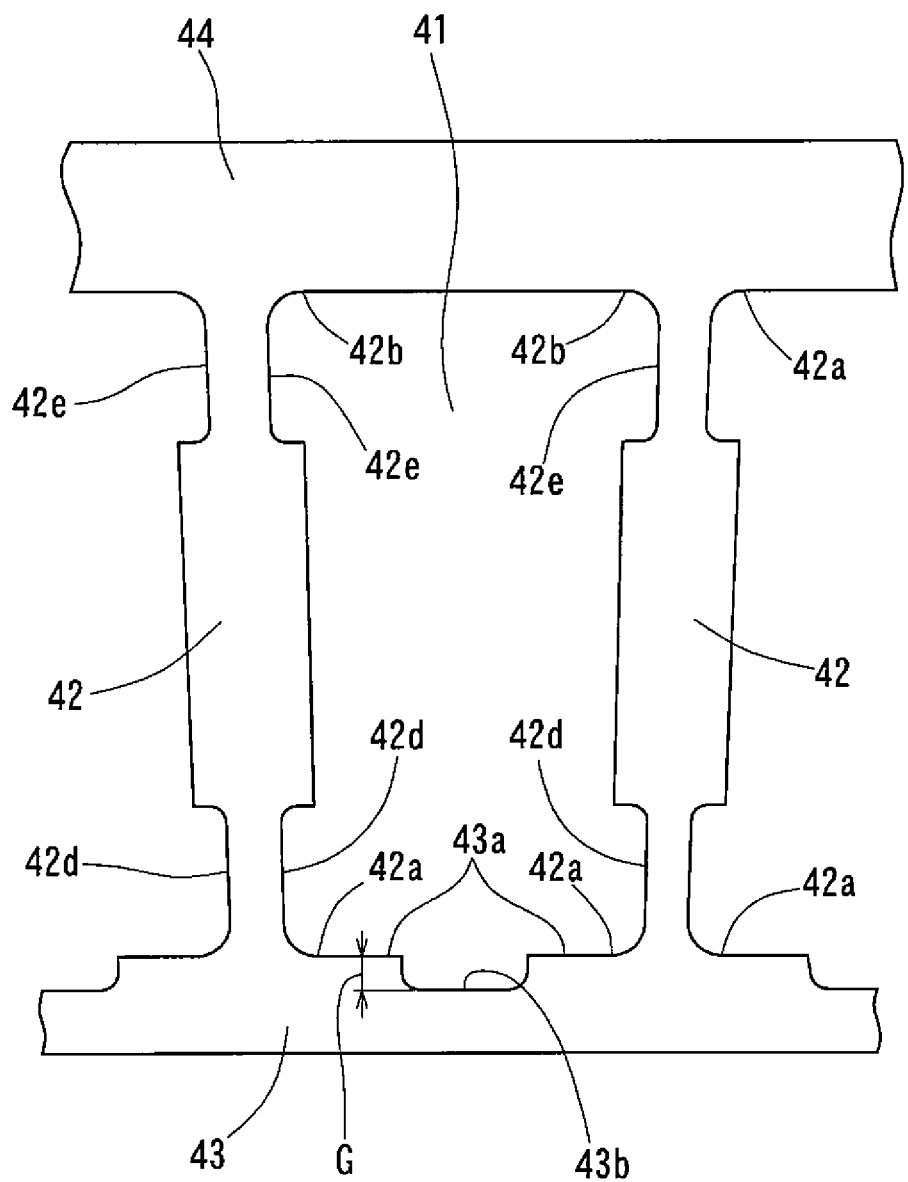
FIG. 3 is a partial enlarged plan view of the first embodiment of the present invention, as seen in the direction of the arrow A in FIG. 2.
Figure 4:
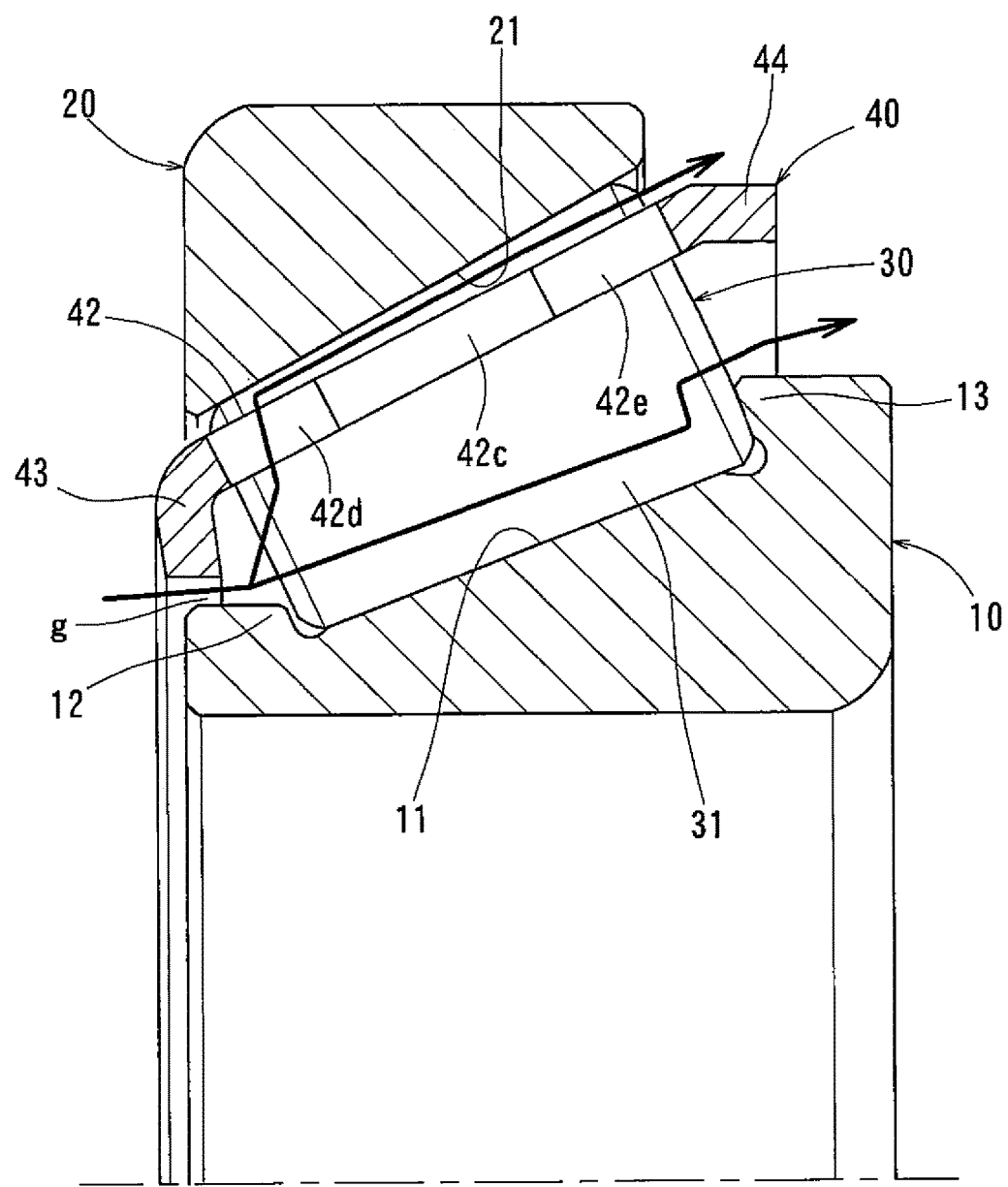
FIG. 4 is a partial sectional view of the first embodiment of the present invention, taken along an axial plane including the bearing center axis.

Now referring to FIGS. 1-5, a tapered roller bearing according to a first embodiment of the present invention is described, which includes, as shown in FIG. 4, an inner race 10 having an outer periphery formed with a raceway surface 11, and including a small flange 12 and a large flange 13; an outer race 20 having an inner periphery formed with a raceway surface 21; and a retainer 40 formed with pockets 41 in which tapered rollers 30 are received. As used herein, the words "circumferential direction", "circumferential" and circumferentially" refer to the circumferential direction around the center axis of the bearing; the words "axial direction", "axial" and "axially" refer to the direction of the center axis of the bearing; and the words "radial direction", "radial" and "radially" refer to a direction perpendicular to the center axis of the bearing. The center axes of the inner race 10, the outer race 20, and the retainer 40 coincide with the center axis of the bearing.

Figure 5:
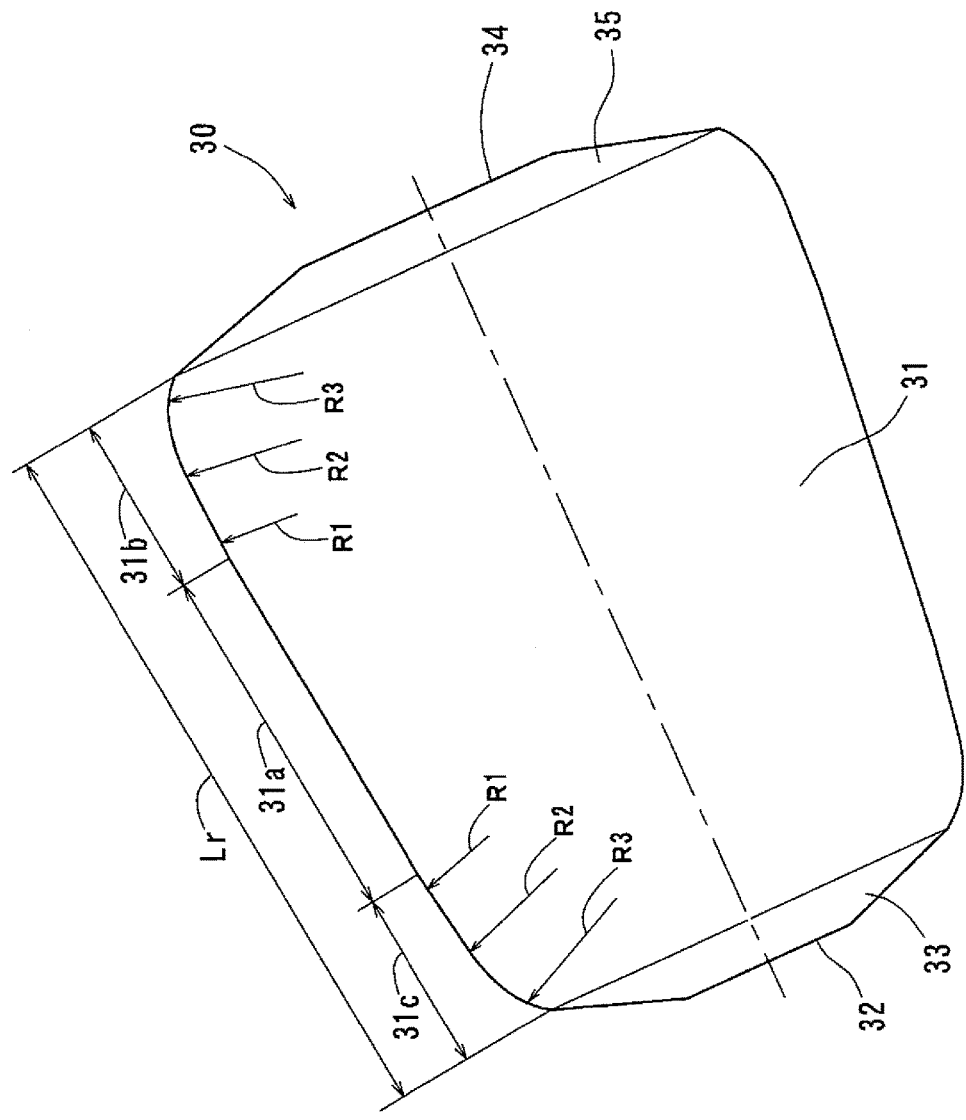
FIG. 5 is an enlarged front view of a tapered roller of FIG. 4.

As shown in FIG. 5, each tapered roller 30 has a rolling surface 31, a small end surface 32, a small-end chamfer 33 formed between the rolling surface 31 and the small end surface 32, a large end surface 34, and a large-end chamfer 35 formed between the large end surface 34 and the rolling surface 31. The rolling surface 31 is brought into rolling contact with the raceway surfaces 11 and 21. The small flange 12, see FIG. 4, contacts the small end surface 32, and prevents separation of the tapered roller 30 from the inner race 10 beyond its small end. During operation of the bearing, each tapered roller 30 is circumferentially guided by the large flange 13 due to sliding contact between the large flange 13 and the large end surface 34 (shown in FIG. 5).

The rolling surface 31 includes a rolling surface central portion 31a formed at the central portion of the entire length Lr of the tapered roller and having a straight generating line, and two crowning portions 31b and 31c each extending from one end of the rolling surface central portion 31a such that its diameter gradually decreases in the direction away from the one end. The "entire length Lr" is the entire length of the tapered roller 30 as measured in the longitudinal direction of the tapered roller, while the "longitudinal direction" is the direction of the generating line of the rolling surface 31.

The rolling surface central portion 31a has a length of not less than half the entire length Lr of the tapered roller 30. If the generating line of the rolling surface central portion 31a, which is used as a reference when measuring the drops of the respective crowning portions 31b and 31c, is a straight line, stable quality control is possible. The length of the rolling surface central portion 31a in the longitudinal direction may be determined within a range in which this object is achievable, and may be equal to or less than half the entire length Lr of the roller.

The crowning portions 31b and 31c are rolling surface portions of which the diameter gradually decreases from the respective ends of the rolling surface central portion 31a in the longitudinal direction. The generating line of each of the crowning portions 31b and 31c is suitably shaped to minimize stress concentration at the end of the rolling surface 31. Each of the crowning portions 31b and 31c is a logarithmic crowning portion having a generating line consisting of three circular arcs R1, R2 and R3 connected together and similar in shape to a logarithmic curve. The generating lines of the respective crowning portions 31b and 31c may be designed in the manner disclosed in Japanese Patent 5334665. Also, the generating line of each of the crowning portions 31b and 31c may consist of a single circular arc. The generating line of the entire rolling surface portion does not have to be formed strictly accurately from the geometric viewpoint, if it is polished and super-finished to sufficient accuracy from the design point of view.

The retainer 40 shown in FIG. 4 is a punched retainer formed by pressing an iron-based sheet material. Since punched retainers can be manufactured with high efficiency and at a low cost, they are suitable for tapered roller bearings for use in motor vehicles and industrial machinery.

FIG. 2 is a section of the bearing taken along a plane perpendicular to the center axis of the tapered roller 30 shown in FIG. 4, and showing the relationship between the retainer 40 and the tapered rollers 30. FIG. 3 shows one of the pockets 41 of the retainer 40 when this pocket is seen in the direction of the arrow A in FIG. 2. As seen in FIGS. 2-4, the retainer 40 includes a plurality of crossbars 42 each separating a respective circumferentially adjacent pair of the pockets 41; a first annular portion 43 continuously connected to first axial ends 42a of the crossbars 42; and a second annular portion 44 having a larger outer diameter than the first annular portion 43 and continuously connected to second axial ends 42b of the crossbars 42 which are axially opposite from the first axial ends 42a. The arrow A in FIG. 2 is in an axial plane passing through the circumferential center of the one of the pockets 41 and including the center axis of the bearing.

The pockets 41 permit the respective tapered rollers 30 to freely move relative to the retainer 40, and are, as shown in FIG. 3, substantially trapezoidal in shape.

As shown in FIGS. 2 and 4, the crossbars 42 are located radially outwardly of the pitch circle of the tapered rollers 30, which are disposed between the raceway surfaces 11 and 21. The raceway surface 11 and small flange 12 of the inner race 10, the tapered rollers 30, and the crossbars 42 of the retainer 40 constitute an inner race assembly.

As shown in FIG. 3, the first axial ends 42a and the second axial ends 42b of the crossbars 42 are ends (transfer points) of the rounded corners of the crossbars 42 continuously connected to the first annular portion 43 and the second annular portion 44, respectively.

Figure 1:
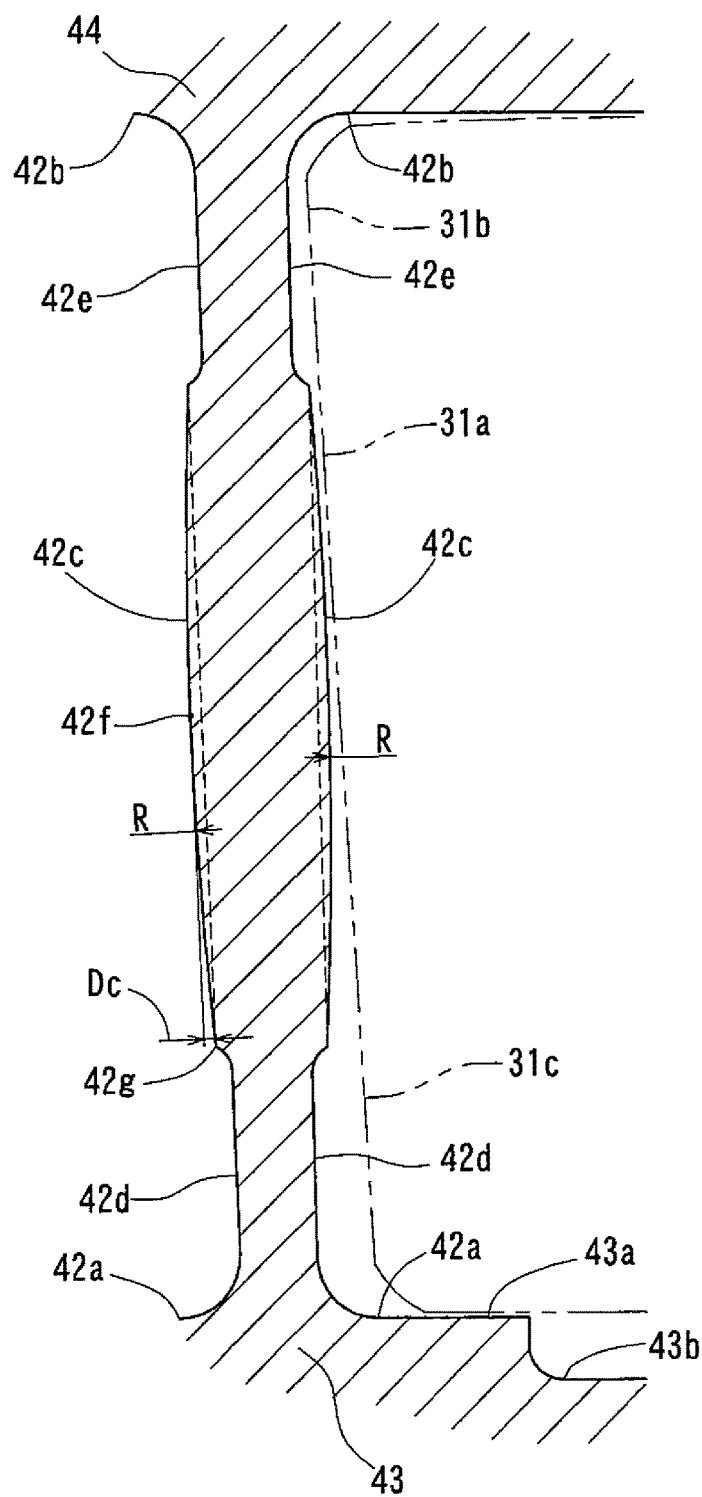
FIG. 1 is a partial enlarged sectional view of a first embodiment of the present invention, taken along line I-I of FIG. 2.

As shown in FIGS. 2-4, each crossbar 42 includes circumferentially opposite guide surfaces 42c configured to circumferentially contact the corresponding tapered rollers 30; first recessed surfaces 42d each located between a respective guide surface 42c and the first axial end 42a of the crossbar 42 and circumferentially recessed from the guide surface 42c in the shape of a cutout; second recessed surfaces 42e each located between a respective guide surface 42c and the second axial end 42b of the crossbar 42 and circumferentially recessed from the guide surface 42c in the shape of a cutout. FIG. 1 illustrates a sectional view taken along lines I-I of FIG. 2. Lines I-I are lines normal to the tangents between the circumferentially opposite guide surfaces 42c and the corresponding tapered rollers 30.

The guide surfaces 42c, shown in FIGS. 1 and 2, are smoothly convex in the longitudinal direction of the tapered rollers 30. Each guide surface 42c has an opposed portion circumferentially opposed to the rolling surface central portion 31a of the corresponding tapered roller 30. The protruding portion protrudes toward the rolling surface central portion 31a of the tapered roller 30, and has an apex portion 42f where the protruding portion has a maximum protruding amount Dc toward the rolling surface central portion 31a of the tapered roller 30. The apex portion 42f is considerably short in the longitudinal direction compared with the rolling surface central portion 31a. In a normal state, each guide surface 42c contacts the tapered roller 30 at the apex portion 42f, where the protruding portion has the maximum protruding amount Dc. This means that the rolling surface central portion 31a, whose generating line is a straight line, circumferentially contacts the guide surface 42c only within such a short range that the contact therebetween is practically no different from point contact, so that it is possible to reduce the contact lengths between the guide surfaces 42c and the corresponding tapered rollers 30. This results in reduced shear resistance of oil between the guide surfaces 42 and the tapered rollers 30, and thus reduced rotation torque of the bearing. The guide surfaces 42c do not have to be formed into strictly accurate convex shapes from the geometric viewpoint, if they are sufficiently smoothly curved surfaces achievable by pressing.

The maximum protruding amount Dc is preferably not less than 1 micrometer not more than 50 micrometers. If it is less than 1 micrometer, it is difficult to form, as well as to control the dimensions of, the guide surfaces 42c. If the maximum protruding amount Dc is larger than 50 micrometers, the contact surface pressures between the tapered rollers 30 and the guide surfaces 42c could be so large that no sufficient oil film forms therebetween, which could result in premature damage to tapered rollers 30 and/or guide surfaces 42c. In order to reduce contact surface pressures, the maximum protruding amount Dc is more preferably not more than 10 μm.

FIG. 1 shows guide surfaces 42c each having a convex shape having a single radius of curvature such that the apex portion 42f having the maximum protruding amount Dc is located at the longitudinal center of the crossbar 42. In this arrangement, the protruding amount Dc decreases toward one end 42g of each guide surface 42c and is zero at the one end 42g. The one end 42g of each guide surface 42c is the transfer point at which the guide surface 42c is continuously connected to the corresponding first recessed surface 42d. The transfer point between the guide surface 42c and the corresponding second recessed surface 42e is the other end of the guide surface 42c.

The guide surfaces 42c are tapered such that their circumferential distances from the corresponding tapered rollers 30 increase in the radially inward direction of the retainer 40 in the plane of FIG. 2, i.e., a plane perpendicular to the center axes of the tapered rollers 30, and such that the length Lc of each guide surface 42c in the plane of FIG. 2 is not less than 5% and not more than 20% of the average diameter of the corresponding tapered roller 30 in the plane of FIG. 2. By limiting the length Lc of the guide surface 42c to such a small value, the range within which oil film forms is correspondingly small between the crossbars 42 and the tapered rollers 30, so that the shear resistance of oil between the tapered rollers 30 and the crossbars 42 is small.

While in Japanese Patent Publication 2007-24170A too, the length Lc is set at 5% or over of the average diameter of the tapered roller 30, the present invention differs from Japanese Patent Publication 2007-24170A in that the length Lc is set at 20% or less, instead of less than 11%, of the average diameter of the tapered roller 30. The reason why the upper limit is raised from the less than 11% in Japanese Patent Publication 2007-24170A to 20% or less in the present invention is because if the upper limit is less than 11%, this makes it difficult to control the dimensions, and thus could result in an increased manufacturing cost.

As shown in FIGS. 1, 3 and 4, since each of the first recessed surfaces 42d and the second recessed surfaces 42e is a cutout recessed in the circumferential direction from the corresponding guide surface 42c, which defines one of the oblique sides of the corresponding (substantially trapezoidal) pocket 41, it never contacts the rolling surface 31 of the corresponding tapered roller 30. In other words, the gaps between the first recessed surfaces 42d and the corresponding rolling surfaces 31, as well as the gaps between the second recessed surfaces 42e and the corresponding rolling surfaces 31, serve as oil flow passages.

A tapered roller bearing produces a pump effect that causes the flow of oil from the small-diameter to large-diameter side of the bearing. Oil that has flowed into the bearing space between the retainer 40 and the inner race 10 produces stirring resistance. When oil that has flowed through the gap between the retainer 40 and the inner race 10 into the bearing space between the retainer 40 and the inner race 10 (shown by thick arrows in FIG. 4) flows toward the large-diameter side of the bearing due to the pump effect, a large amount of such oil quickly flows through the gaps between the first recessed surfaces 42d and the rolling surfaces 31 into the bearing space between the retainer 40 and the outer race 20. As a result, a smaller amount of oil flows through the retainer 40 and the inner race 10 and reaches or approaches the large flange 13. This results in reduced stirring resistance of oil.

Also, compared to an arrangement in which the crossbars have guide surfaces extending the entire lengths thereof, and thus have neither the first recessed surfaces 42d nor the second recessed surfaces 42e, since the crossbars 42 do not contact the tapered rollers 30 at their portions where there are the first recessed surfaces 42d and the second recessed surfaces 42, the shear torque of the tapered rollers 30 and the crossbars 42 by oil is small.

The first annular portion 43 has pocket end surfaces 43a that axially contact the respective tapered rollers 30, and third recessed surfaces 43b each recessed in the axial direction from a respective pocket end surface 43a in the shape of a cutout.

Each pocket surface 43a defines the circumferentially shorter one of the two parallel sides of the corresponding (substantially trapezoidal) pocket 41, and is circumferentially continuous with the first axial ends 42a of the corresponding crossbars 42. Each third recessed surface 43b is located at a circumferentially central portion between the corresponding circumferentially adjacent pair of crossbars 42, and is recessed to circumferentially separate the corresponding pocket end surface 43a into two portions. Thus, the third recessed surfaces 43b never axially contact the respective tapered rollers 30, and the gaps between the third recessed surfaces 43b and the tapered rollers 30 serve as oil flow passages. When oil that has flowed through the gap between the retainer 40 and the inner race 10 into the bearing space between the retainer 40 and the inner race 10 flows toward the large-diameter side of the bearing due to the pump effect, a large amount of such oil quickly flows through the gaps between the third recessed surfaces 43*b* and the tapered rollers 30 rolling surfaces into the bearing space between the retainer 40 and the outer race 20. This reduces the stirring resistance of oil.

As shown in FIG. 4, the first annular portion 43 has an opposed portion radially opposed to the radially outer surface of the small flange 12, and defining the inner diameter of the first annular portion 43 (and thus the inner diameter of the retainer 40). The radial gap g between the inner diameter of the first annular portion 43 and the radially outer surface of the small flange 12 is 2% or less of the outer diameter of the small flange 12 to reduce the amount of oil flowing into the bearing through the gap between the retainer 40 and the inner race 10, and thereby reduce the stirring resistance of oil.

In the first embodiment, the first recessed surfaces 42*d* of the crossbars 42 and the third recessed surfaces 43*b* of the first annular portion 43 allow oil that has flowed through the gap between the retainer 40 and the inner race 10 into the bearing space between the retainer 40 and the inner race 10 to quickly flow into the bearing space between the retainer 40 and the outer race 20, thereby reducing the stirring resistance of oil. The first recessed surfaces 42*d* and the second recessed surfaces 42*e* of the crossbars 42 reduce the shear resistance of oil between the tapered rollers 30 and the crossbars 42. By determining the lengths Lc of the tapered guide surfaces 42*c* at 5% or over and 20% or less of the average diameter of the corresponding tapered rollers 30 as measured in the plane of FIG. 2, which is perpendicular to the center axes of the tapered rollers 30, the range within which oil film forms is small, so that the shear resistance of oil between the tapered rollers 30 and the crossbars 42 is correspondingly small.

The retainer 40 of the first embodiment thus achieves the purposes of reducing the stirring resistance of oil and the shear resistance of oil. Since the guide surfaces 42*c* have convex shapes, when this retainer 40 is used in combination with tapered rollers 30 having rolling surface central portions 31*a* having straight generating lines, the contact lengths between the guide surfaces 42*c* and the corresponding tapered roller 30 are short. This, in addition to the first recessed surfaces 42*d*, second recessed surfaces 42*e*, and third recessed surfaces 43*b*, and the shorter lengths Lc of the guide surfaces 42*c*, further reduces the stirring resistance of oil, shear resistance of oil, and rotation torque of the bearing.

Figure 6:
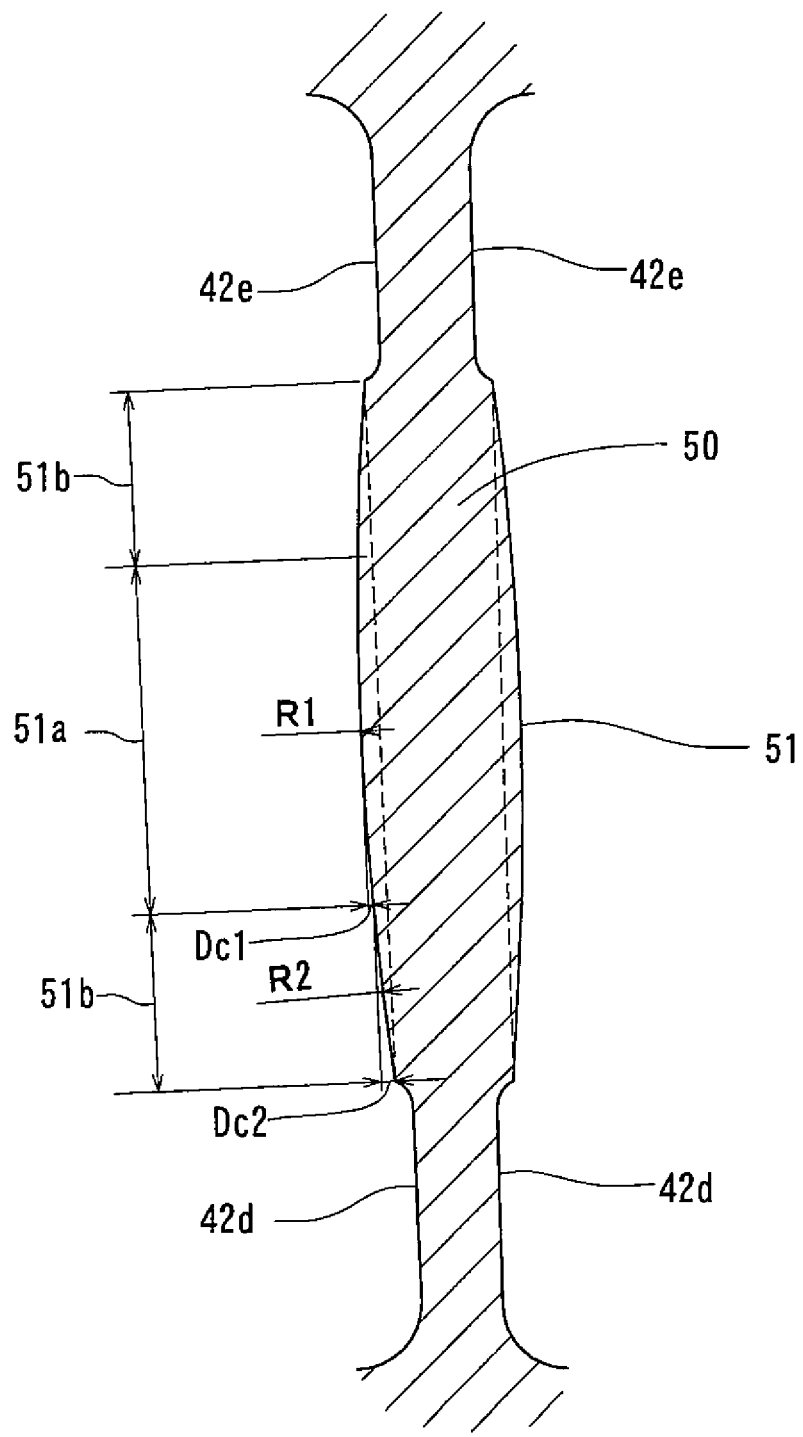
FIG. 6 is a partial enlarged sectional view of a second embodiment of the present invention, taken along the line corresponding to line I-I of FIG. 2.

In the first embodiment, the convex shape of each guide surface 42*c* has a single radius of curvature, but each guide surface 42*c* may have a composite convex shape consisting of a plurality of curves of different radii of curvature, and/or a straight line or lines that are smoothly connected together. FIG. 6 shows, as an example of such composite convex shape, a sixth embodiment, of which only what differs from the first embodiment is described below.

The second embodiment, shown in FIG. 6, differs from the first embodiment in that the guide surfaces 51 of the crossbars 50 each have a composite convex shape as described above. In particular, each guide surface 51 includes a central portion 51*a* located at the longitudinal central portion of the crossbar 50 and having a first radius of curvature R1, and the remaining portions 51*b*, i.e., the portions continuously connected to the respective ends of the central portion 51*a*, each having a second radius of curvature R2.

The central portion 51*a* has a convex shape with a minute protruding amount compared to the remaining portions 51*b*. By way of example, the protruding amount Dc1 of the central portion 51*a* is set at 1-5 micrometers; the protruding amounts Dc2 of the respective remaining portions 51*b* are set at 5-10 micrometers; and the protruding amount of the entire guide surface 51 (Dc1+Dc2) is set at 6-15 micrometers.

The length of the central portion 51*a* is half the entire length of the guide surface 51. The length of each remaining portion 51*b* is half the entire length of the guide surface 51 subtracted by the length of the central portion 51*a*.

The central portion 51*a* is sufficiently short in the longitudinal direction of the tapered rollers, compared to the rolling surface central portion of the corresponding tapered roller, and may, though not shown, extend in a straight line in the longitudinal direction of the crossbar 50, instead of having the radial of curvature R1. In this case, the guide surface has, as a whole, a convex shape having a protruding amount equal to the protruding amounts Dc2 of the remaining portions 51*b*, so that the remaining portions 51*b*, which do not contact the tapered roller, reduce the contact length between the guide surface and the tapered roller.

In either of the first and second embodiments, the guide surfaces are formed between the first and second recessed surfaces of the crossbars. In an arrangement in which such guide surfaces are provided, the third recessed surfaces may or may not be provided. For example, the third embodiment, shown in FIG. 7, differs from the first and second embodiments in that the third recessed surfaces are omitted, and only the first recessed surfaces 42*d* and the second recessed surfaces 42*e* are used, which are cutouts recessed axially or circumferentially from the wall surfaces defining the pockets 41. Each of the pocket end surfaces 43*a*' of the first annular portion 43' extends continuously between the corresponding circumferentially adjacent pair of crossbars 42.

In the third embodiment, as in the first embodiment, the first recessed surfaces 42*d* and the second recessed surfaces 42*e* of the crossbars 42, and the tapered guide surfaces having the predetermined length Lc (see FIG. 2) reduce the stirring resistance and shear resistance of oil, while the contact lengths between the convex guide surfaces and the rolling surface central portions of the tapered rollers (not shown) are short, so that the rotation torque of the bearing is small. The third embodiment is suitable in situations in which the first annular portion 43' is so narrow in axial width that it is difficult to form the third recessed surfaces in the shape of cutouts by pressing the first annular portion 43'.

Figure 8:
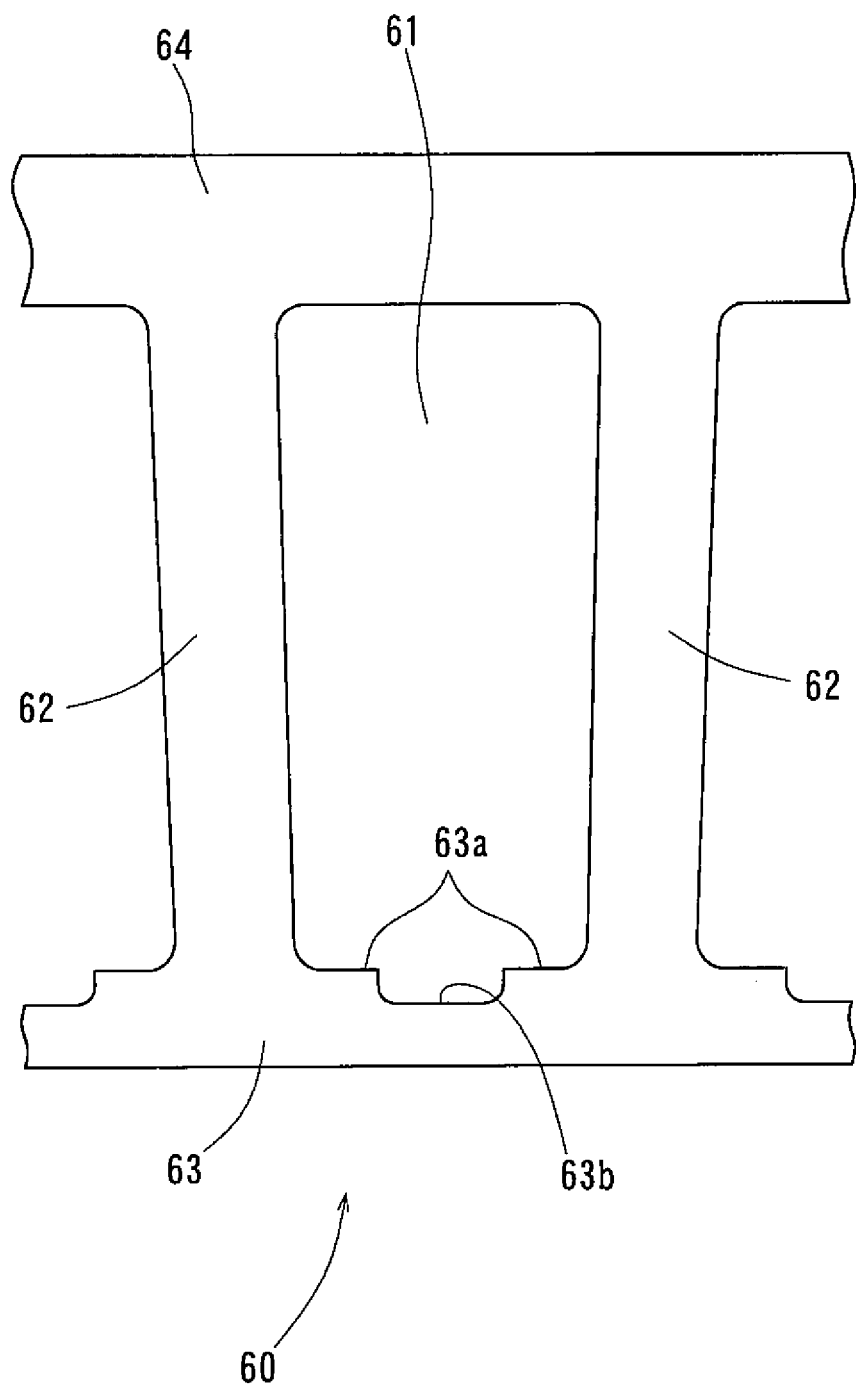
FIG. 8 is a partial enlarged plan view of a fourth embodiment of the present invention, as seen in the direction corresponding to the direction of the arrow A in FIG. 2.
Figure 9:
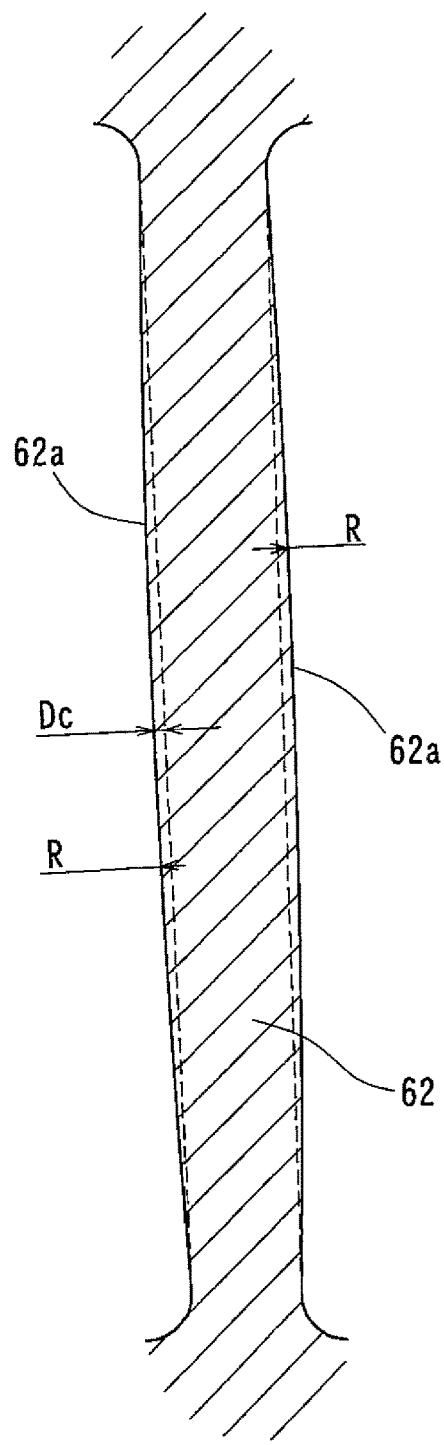
FIG. 9 is a partial enlarged sectional view of the fourth embodiment of the present invention, taken along the line corresponding to line I-I of FIG. 2.

In an arrangement in which the convex guide surfaces are provided, the first and second recessed surfaces may be omitted. For example, the retainer 60 of the fourth embodiment, shown in FIGS. 8 and 9, differs from the first and second embodiments in that the first and second recessed surfaces are not formed in the crossbars 62, which define the circumferential ends of the respective pockets 61, and only third recessed surfaces are formed which are cutouts recessed axially or circumferentially from the wall surfaces defining the pockets 61. Each convex guide surface 62*a* of the fourth embodiment has straight portions connected to the respective rounded corners continuously connected to the first annular portion 63 and the second annular portion 64. The third recessed surfaces 63*b*, which are recessed from the pocket end surfaces 63*a* of the first annular portion 63, are the only recessed surfaces through which oil can quickly flow into the space between the outer race and the retainer. The guide surfaces 62*a* of the crossbars 62 begin at the transfer points between the guide surfaces 62*a* and the respective rounded corners. While the guide surfaces 62*a* have the same maximum protruding amount Dc as the guide surfaces of the first embodiment, and each have, as with the guide surfaces of the first embodiment, a single radius of curvature R, the guide surfaces 62*a* differ from the guide surfaces of the first embodiment in that the former extend to the rounded corners.

In the fourth embodiment, as in the first embodiment, the third recessed surfaces 63*b* of the first annular portion 63, and the tapered guide surfaces 62*a* having the predetermined length Lc (see FIG. 2) reduce the stirring resistance and shear resistance of oil, while the contact lengths between guide surfaces 62*a*, which are convex in shape, and the rolling surface central portions of the tapered rollers (not shown) are short, so that the rotation torque of the bearing is small. The fourth embodiment is suitably applicable to a bearing which is rotated at high speed because the crossbars 62 are free of e.g., the first recessed surfaces in the shape of cutouts, and thus can withstand high loads when the bearing rotates at high speed.

In an arrangement in which the crossbars are free of the first and second recessed surfaces, each convex guide surfaces may have a composite shape consisting of a plurality of curves having different radii of curvature, and or a straight line or lines smoothly connected together. The fifth embodiment, shown in FIG. 10, is such an example.

Figure 10:
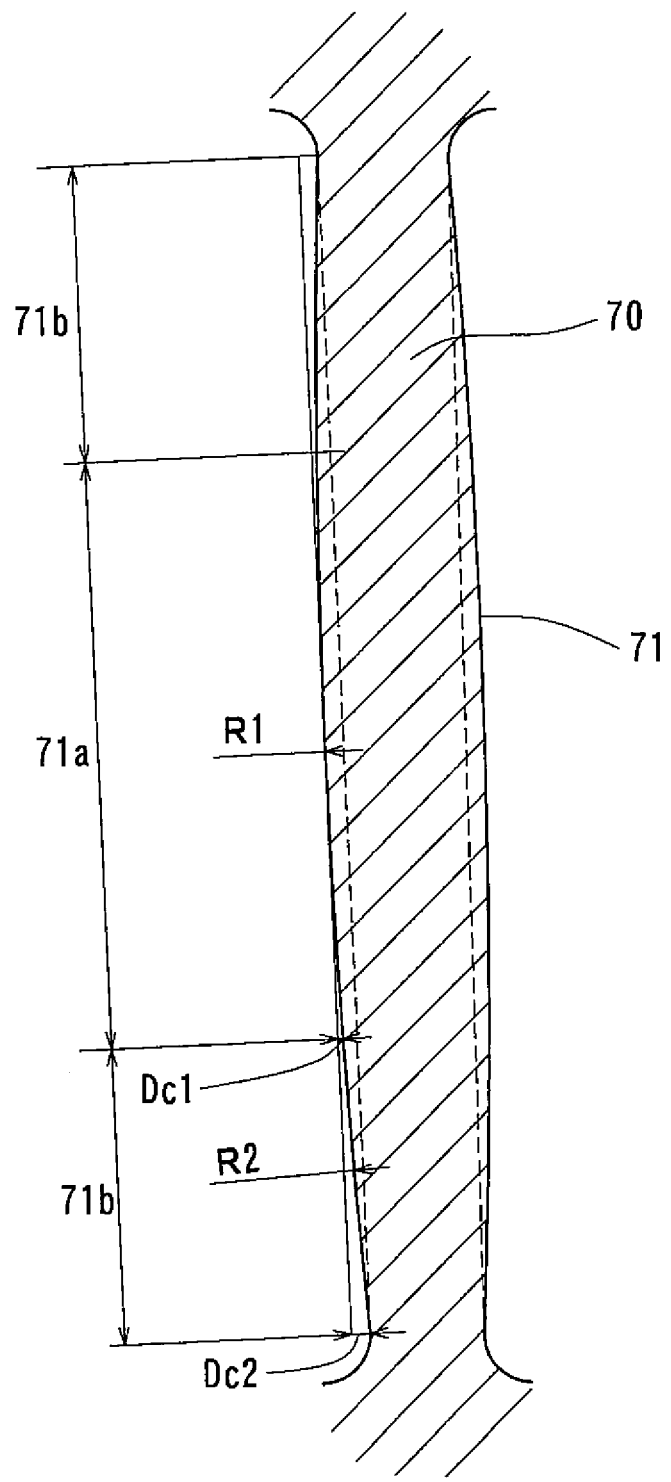
FIG. 10 is a partial enlarged sectional view of a fifth embodiment of the present invention, taken along the line corresponding to line I-I of FIG. 2.

In the fifth embodiment of FIG. 10, the crossbars 70 are free of the first and second recessed surfaces so that each convex guide surface 71 extends the entire length of the crossbar 70 between the corresponding two rounded corners, with each guide surface 71 having a composite shape consisting of curves having different radii of curvature. In particular, as with the second embodiment, each guide surface 71 includes a central portion 71*a* having a first radius of curvature R1, the remaining portions 71*b* having a second radius of curvature R2.

Figure 11:
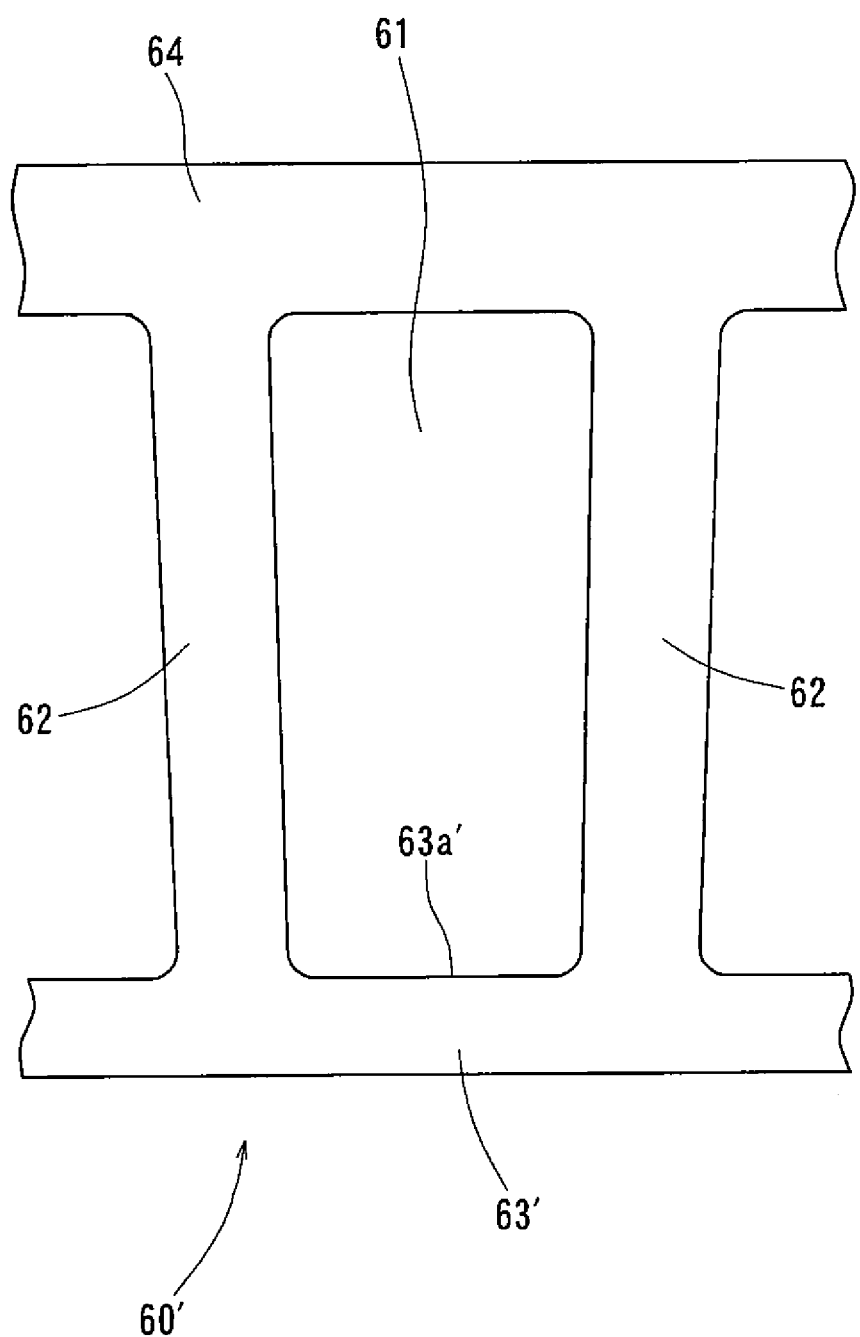
FIG. 11 is a partial enlarged plan view of a sixth embodiment of the present invention, as seen in the direction corresponding to the direction of the arrow A in FIG. 2.

In an arrangement in which the convex guide surfaces are provided, any or all of the first to third recessed surfaces may be omitted. For example, in the sixth embodiment, shown in FIG. 11, the third recessed surfaces of the fourth embodiment are further omitted, so that the retainer of the fourth embodiment is free of any cutouts recessed axially or circumferentially from the wall surfaces defining the pockets 61. The pocket end surfaces 63*a*' extend continuously between the respective circumferentially adjacent pairs of crossbars 62. In the sixth embodiment, as in the first embodiment, the tapered convex guide surfaces having the predetermined lengths Lc (see FIG. 2) reduce the shear resistance of oil, while the contact lengths between the guide surfaces, having the convex shape, and the rolling surface central portions of the tapered rollers (not shown) are short, so that the rotation torque of the bearing is small. The sixth embodiment is suitable in situations in which the first annular portion 63' is so narrow in axial width that it is difficult to form the third recessed surfaces in the shape of cutouts by pressing the first annular portion 63', and it is necessary to ensure high strength of the retainer.

The convex guide surfaces of any of the embodiments may be formed first by forming pockets in a peripheral wall portion of a workpiece by punching, and then finishing the rough punched surfaces by surface pressing. The peripheral wall portion of the workpiece is a conical portion having a radially outer surface corresponding to the radially outer surfaces of the crossbars, and a radially inner surface corresponding to the radially inner surfaces of the crossbars. Pocket forming punches used to form the pockets by punching each include a cutting edge having the shape of a pocket when the pocket is seen in the direction of the arrow in FIG. 2. Surface pressing punches used for surface pressing each includes a pressing surface for forming a convex guide surface by transferring the shape of the pressing surface.

Figure 12:
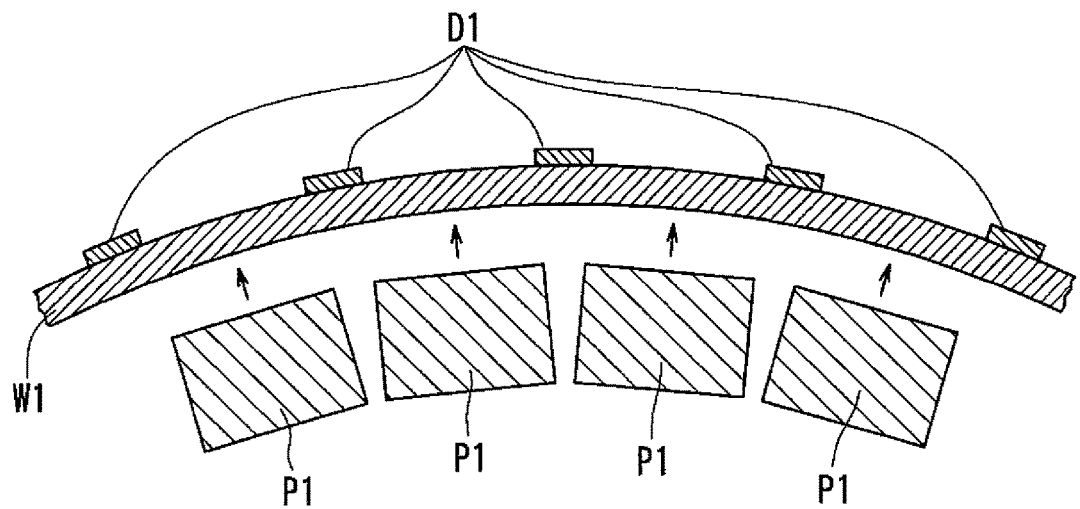
FIG. 12 schematically illustrates how pockets are formed in a retainer by punching from radially inwardly of the retainer, when forming guide surfaces according to any embodiment of the present invention.
Figure 13:
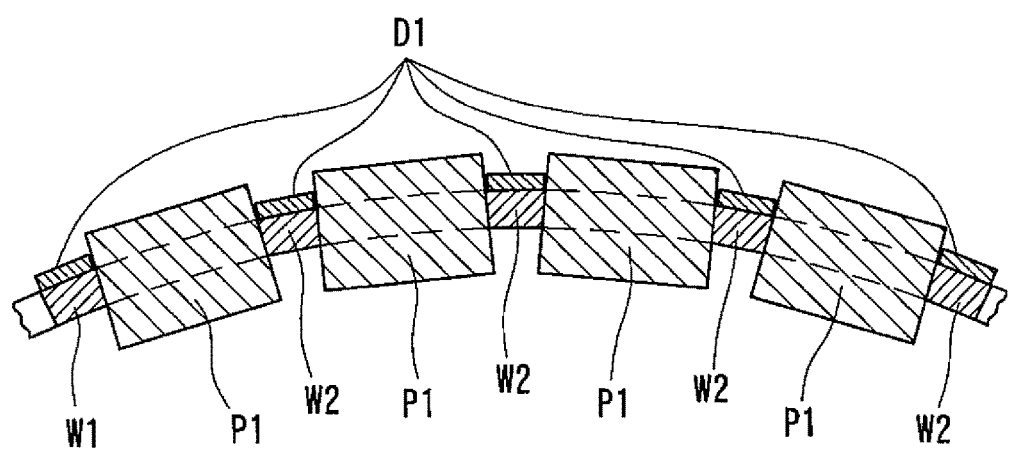
FIG. 13 illustrates how punches are moved from the state of FIG. 12 to punch the pockets.
Figure 14:
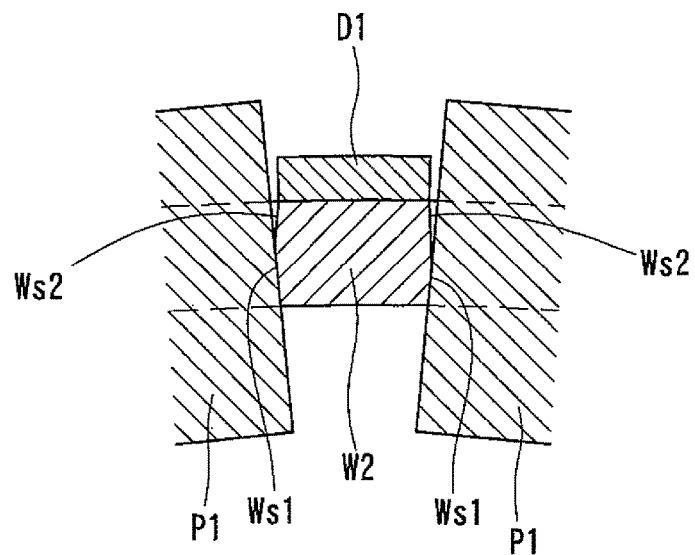
FIG. 14 is an enlarged view of and around a punched surface shown in FIG. 13.

As shown in FIGS. 12 and 13 for example, with the radially outer surface of the workpiece peripheral wall portion W1 supported by dies D1, pocket forming punches P1 arranged radially inwardly of the workpiece peripheral wall portion W1 are driven in the radial direction to punch the workpiece peripheral portion W1, thereby forming roughly shaped crossbar portions W2, see FIG. 14, which substantially correspond in shape to the crossbars. The punched surfaces of the roughly shaped crossbar portions W2 each include a radially inner shear surface portion Ws1, and a radially outer fracture surface portion Ws2.

Figure 15:
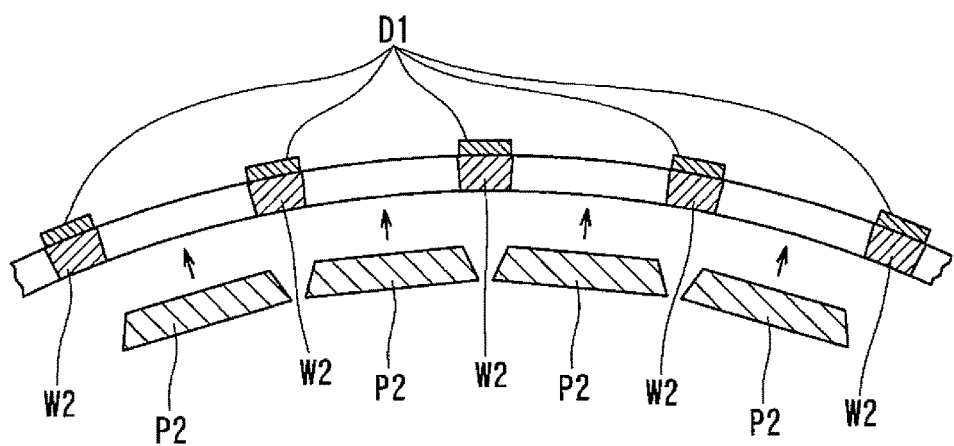
FIG. 15 schematically illustrates how surface pressing is performed from radially inwardly of the retainer, after forming the pockets in FIG. 13.
Figure 16:
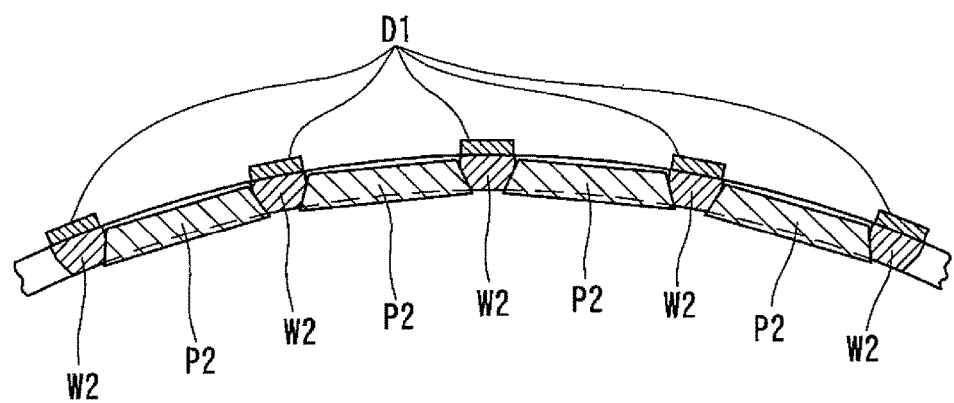
FIG. 16 illustrates how punches are moved from the state of FIG. 15 for surface pressing.
Figure 17:
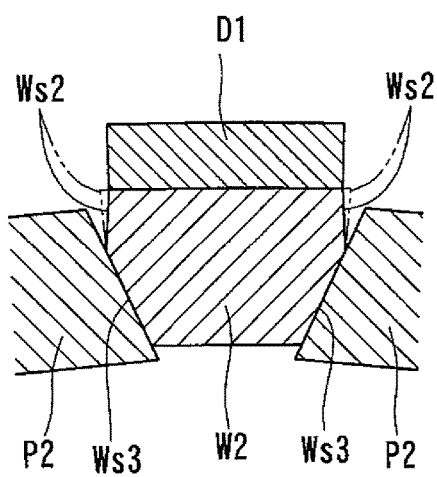
FIG. 17 is an enlarged view of and around a punched surface shown in FIG. 16.

As shown in FIGS. 15 and 16, with the radially outer surfaces of the roughly shaped crossbar portions W2 supported by the dies D1, surface pressing punches P2 arranged radially inwardly of the respective roughly shaped crossbar portions W2 are driven in the radial direction to press the punched surfaces of the respective roughly shaped crossbar portions W2. This causes the roughly shaped crossbar portions W2 to be deformed such that fracture surface portions Ws2 protrude in the circumferential direction as shown by two-dot chain lines in FIG. 17, and forms a convex guide surface Ws3 on each punched surface.

Figure 18:
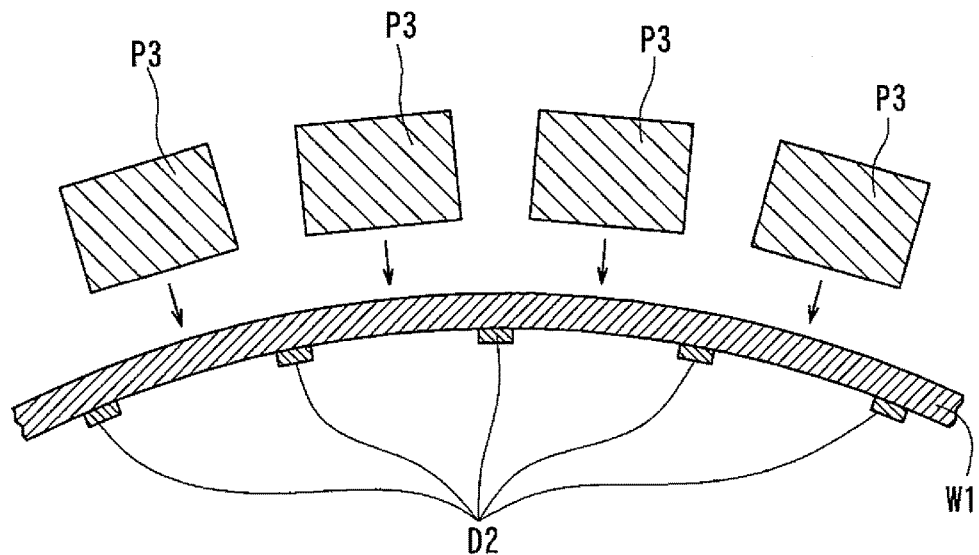
FIG. 18 schematically illustrates how pockets are formed in a retainer by punching from radially outwardly of the retainer, when forming guide surfaces according to any embodiment of the present invention.
Figure 19:
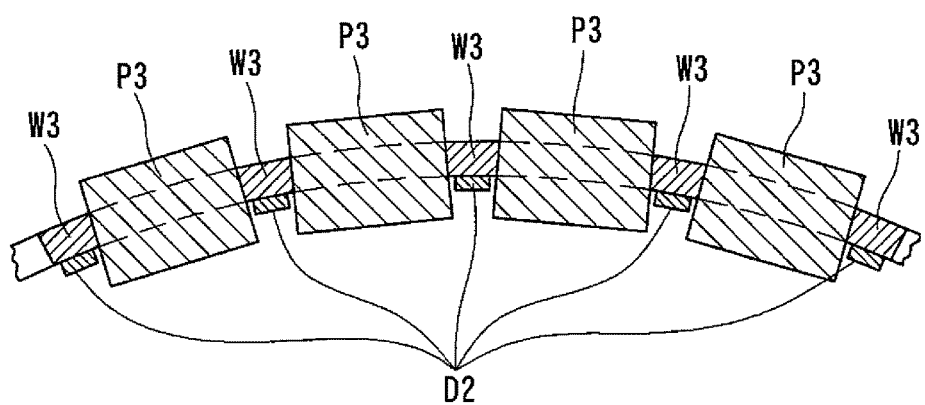
FIG. 19 illustrates how punches are moved from the state of FIG. 18 to form pockets by punching.
Figure 20:
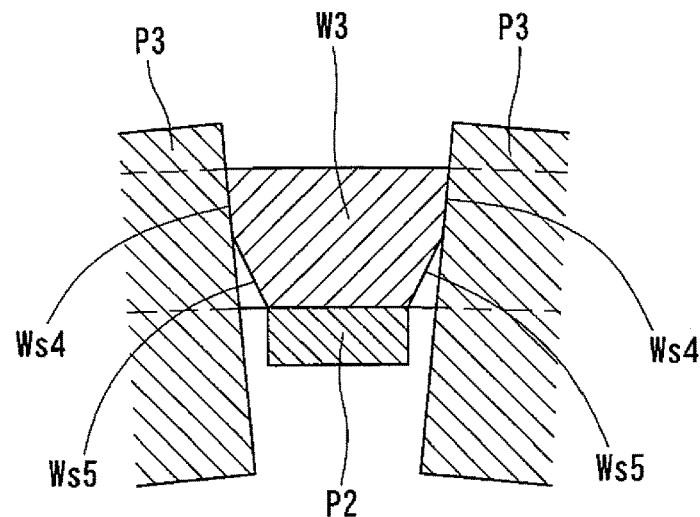
FIG. 20 is an enlarged view of and around a punched surface shown in FIG. 19.

Pocket forming punches may be used to punch the workpiece peripheral wall portion from radially outwardly thereof. For example, as shown in FIGS. 18 and 19, with the radially inner surface of the workpiece peripheral wall portion W1 supported by dies D2, pocket forming punches P3 arranged radially outwardly of the workpiece peripheral wall portion W1 is driven in the radial direction to punch the workpiece peripheral wall portion W1 as shown in FIG. 19, thereby forming roughly shaped crossbar portions W3 as shown in FIG. 20. Punched surfaces of such roughly shaped crossbar portions W3 each include a radially outer shear surface portion Ws4, and a radially inner fracture surface portion Ws5. In this arrangement, the clearance between each die D2 and the corresponding pocket forming punch P3 is larger than the corresponding clearance in the arrangement of FIG. 17, so that the fracture surface portion Ws5 of each punched surface decreases to a greater degree relative to the shear surface portion Ws3, compared to the arrangement of FIG. 17. The punched surfaces are pressed by the surface pressing punches in the same manner as in FIG. 15, except that the shear surface portions Ws5 of the roughly shaped crossbar portions W3 are pressed by the surface pressing punches.

The first, second and/or third recessed surfaces are formed by punching excess portions of the workpiece peripheral wall portion corresponding to the recessed surfaces, by the pocket forming punches. If, for example, the first recessed surfaces are formed, the shape of the retainer is preferably considered to minimize deformation of the pockets formed by the pocket forming punches.

Figure 21:
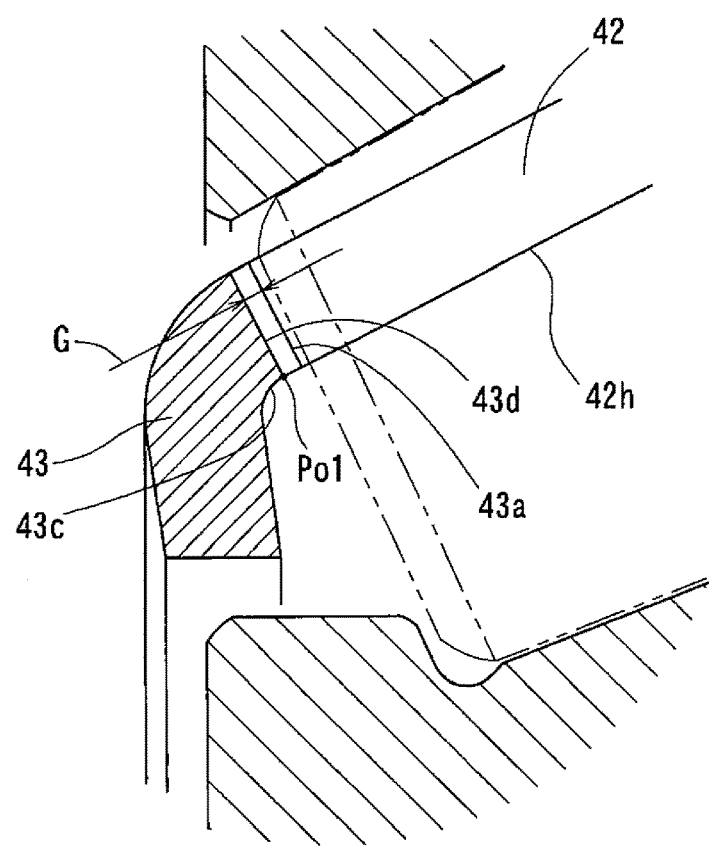
FIG. 21 is sectional view taken along an axial plane passing through a third recessed surface.

In particular, if the retainer includes the third recessed surfaces, it is preferable, as shown in FIGS. 3 and 21, that the crossbars 42 have radially inner surfaces 42*h* that lies in an imaginary conical surface; the first annular portion 43 has a rounded corner surface 43*c* which is bent in the radial direction from a straight portion flush with the radially inner surfaces 42*h* of the crossbars 42 (point Po1 in FIG. 21 indicates the boundary between the straight portion and the rounded corner surface 43*c*); and the third recessed surfaces 43*d* have depths G of 0.1 mm or over, and located within the straight portion. The depths G of the third recessed surfaces 43d are the values measured from the respective pocket end surfaces 43a in the direction of the radially inner surfaces 42h of the crossbars 42. Such a retainer can be formed by forming pockets in a cup-shaped workpiece including a peripheral wall portion having the above-described radially inner surfaces 42h, and the above-described first annular portion 43, which is formed with the above-described straight portion and rounded corner surface 43c. With this arrangement, while forming the pockets by punching, the workpiece peripheral wall portion shows sufficient rigidity. Since the third recessed surfaces 43d are formed by punching within the range of the radially inner surfaces 42h and the straight portion of the first annular portion 43, which is an extension of the radially inner surfaces 42h, and are not formed in the curved portion corresponding to the rounded corner surface 43c, it is possible to prevent deformation of the pockets. The depths G of the third recessed surfaces 43d are 0.1 mm or over to ensure minimum gaps that allow passage of enough oil for sufficiently low torque.

Figure 7:
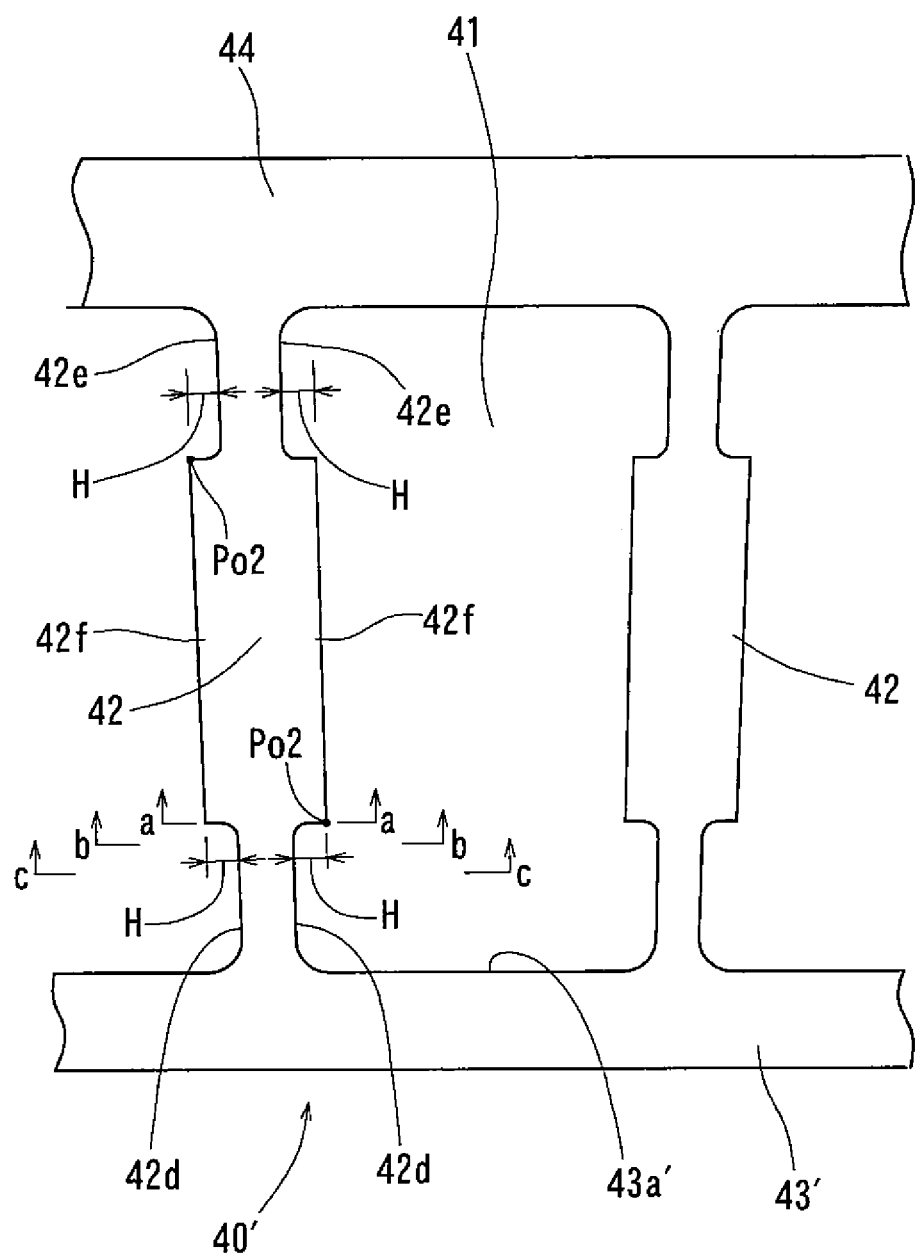
FIG. 7 is a partial enlarged plan view of a third embodiment of the present invention, as seen in the direction corresponding to the direction of the arrow A in FIG. 2.
Figure 22:
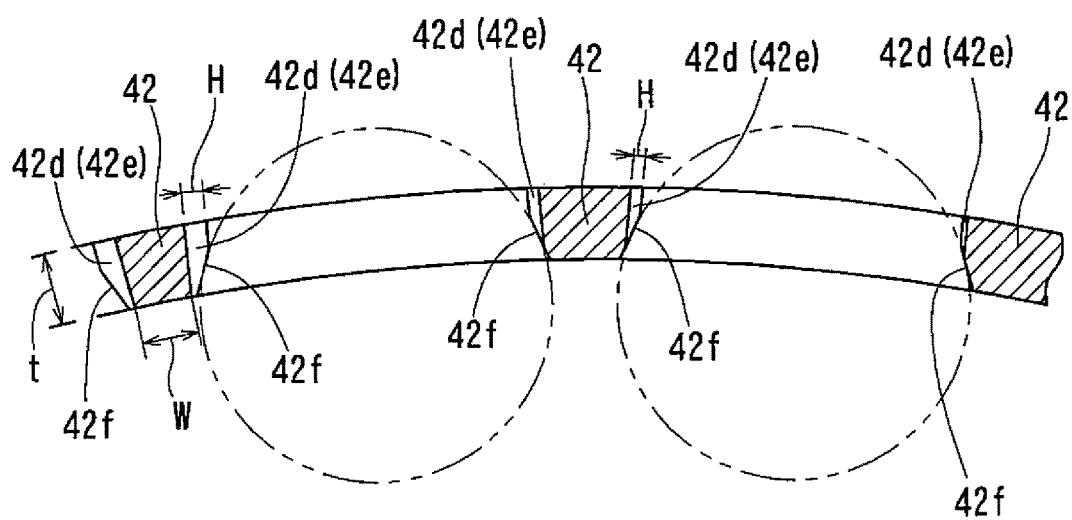
FIG. 22 shows sections of three crossbars, taken along lines a-a, b-b, and c-c of FIG. 7 for the right, middle and left crossbars, respectively.

If the retainer includes the first and second recessed surfaces, it is preferable, as shown in FIGS. 7 and 22, that the depths H of both of the first recessed surfaces 42d and the second recessed surfaces 42e are determined such that the ratio of the width w of each crossbar 42 to its wall thickness t is equal to or lower than 1.05. The depths H of the first recessed surfaces 42d and the second recessed surfaces 42e are the values measured in the circumferential direction from transfer points (indicated by Po2 in FIG. 7) between the first and second recessed surfaces 42d and 42e, which are both cutouts, and the longitudinally central portions of the crossbars 42, in the circumferential direction. The width w of each crossbar 42 is the linear distance between two circumferentially opposed points on the circumferentially opposed punched surfaces of the crossbar 42. The wall thickness t of each crossbar 42 is the linear distance between two radially opposed points on the radially inner surface and the radially outer surface of the crossbar 42. If the ratio of width w to wall thickness t is lower than 1.05, the roughly shaped crossbar portions may not be rigid enough, and could be twisted, which may result in poor quality of the finished product. If the above ratio is 1.05 or higher, the crossbars 42 will never be unduly twisted.

In FIG. 22, the section of the rightmost crossbar 42 is taken along line a-a of FIG. 7, which passes through point Po2; the section of the central crossbar 42 is taken along line b-b of FIG. 7; and the section of the leftmost crossbar 42 is taken along line c-c of FIG. 7. On the c-c section, the depth H of the first recessed surface 42d is maximum, and the ratio of width w to wall thickness t is 1.05. This maximizes the gap that allows passage of enough oil for lower torque. The second recessed surfaces 42e are also similarly shaped. Basically, the depths H of the first recessed surfaces 42d and the second recessed surfaces 42e are determined such that their bottoms do not protrude beyond the apex portions 42f of the corresponding guide surfaces, where the crossbars are supposed to contact the tapered rollers. This prevents the tapered rollers from coming into contact with the bottoms of the first recessed surfaces 42d and the second recessed surfaces 42e, thereby reducing the slide resistance between the crossbars 42 and the tapered rollers, and thus the torque. Thus, the depths H of the first and second recessed surfaces 42d and 42e are determined, at the least, such that their bottoms are level with the apex portions 42f (see the section of the rightmost crossbar 42 in FIG. 22, which is taken along line a-a of FIG. 7).

It is to be understood that the embodiments disclosed herein are mere examples in every respect, and the present invention is not limited to these embodiments. It is therefore to be understood that the present invention is defined not by the description of the present invention but by the claims, and covers any modifications that are literally or equivalently recited in the claims.

DESCRIPTION OF THE NUMERALS

10. Inner race
11. Raceway surface
12. Small flange
13. Large flange
30. Tapered roller
31a. Rolling surface central portion
31b, 31c. Crowning portion
40, 60. Retainer
41, 61. Pocket
42, 50, 62, 70. Crossbar
42a. First axial end
42b. Second axial end
42c, 51, 62a, 71. Guide surface
42d. First recessed surface
42e. Second recessed surface
42h. Radially inner surface
43, 43', 63, 63'. First annular portion
43a, 43a', 63a, 63a'. Pocket end surface
43b, 63b. Third recessed surface
44, 64. Second annular portion
Dc. Protruding amount
g. Radial gap
Lc. Length
Lr. Roller entire length

What is claimed is:

1. A retainer formed with pockets configured to each receive one of a plurality of tapered rollers, the retainer comprising:
   a plurality of crossbars separating circumferentially adjacent pairs of the pockets from each other;
   a first annular portion continuously connected to first axial ends of the crossbars; and
   a second annular portion having an outer diameter larger than an outer diameter of the first annular portion, and continuously connected to second axial ends of the crossbars which are opposite from the first axial ends of the crossbars,
   wherein each of the crossbars includes:
      guide surfaces configured to circumferentially contact a corresponding one of the tapered rollers;
      first recessed surfaces in the form of cutouts each located between a respective one of the guide surfaces and the first axial end of a corresponding one of the crossbars, and circumferentially recessed from the respective one of the guide surfaces; and
      second recessed surfaces in the form of cutouts each located between a respective one of the guide surfaces and the second axial end of a corresponding one of the crossbars, and circumferentially recessed from the respective one of the guide surfaces,
   wherein the guide surfaces are smoothly convex in a longitudinal direction of the tapered rollers,
   wherein each of the tapered rollers includes a rolling surface central portion located at a central portion of an entire length of a respective one of the tapered rollers, and having a straight generating line, and crowning portions each extending from an end of the rolling surface central portion such that a diameter of the crowning portion gradually decreases in a direction away from the end, and wherein each of the guide surfaces has a protruding portion having a maximum protruding amount protruding toward the rolling surface central portion of a corresponding one of the tapered rollers, the protruding portion being shorter, in the longitudinal direction of the corresponding one of the tapered rollers, than the rolling surface central portion of the corresponding one of the tapered rollers.

2. The retainer of claim 1, wherein the first annular portion includes pocket end surfaces each configured to axially contact a respective one of the tapered rollers, and third recessed surfaces in the form of cutouts each axially recessed from a respective one of the pocket end surfaces, and wherein each of the third recessed surfaces is located at a circumferentially central portion between a respective circumferentially adjacent pair of the crossbars.

3. The retainer of claim 2, wherein the crossbars have radially inner surfaces that lie in an imaginary conical surface, wherein the first annular portion has a straight portion flush with the radially inner surfaces of the crossbars, and a rounded corner surface bent in a radial direction from the straight portion, and wherein the third recessed surfaces have depths of 0.1 mm or greater, and are located within the straight portion.

4. The retainer of claim 3, wherein the maximum protruding amount is not less than 1 micrometer and not more than 50 micrometers.

5. The retainer of claim 2, wherein each of the guide surfaces is tapered and has a length which is not less than 5% and not more than 20% of an average diameter of a corresponding one of the tapered rollers, in a plane perpendicular to a center axis of the corresponding one of the tapered rollers.

6. The retainer of claim 5, wherein each of the first recessed surfaces and the second recessed surfaces has a depth determined such that a ratio of a width of a corresponding one of the crossbars to a wall thickness of the corresponding one of the crossbars is equal to or higher than 1.05.

7. The retainer of claim 2, wherein each of the first recessed surfaces and the second recessed surfaces has a depth determined such that a ratio of a width of a corresponding one of the crossbars to a wall thickness of the corresponding one of the crossbars is equal to or higher than 1.05.

8. The retainer of claim 2, wherein the maximum protruding amount is not less than 1 micrometer and not more than 50 micrometers.

9. The retainer of claim 1, wherein each of the guide surfaces is tapered and has a length which is not less than 5% and not more than 20% of an average diameter of a corresponding one of the tapered rollers, in a plane perpendicular to a center axis of the corresponding one of the tapered rollers.

10. The retainer of claim 9, wherein each of the first recessed surfaces and the second recessed surfaces has a depth determined such that a ratio of a width of a corresponding one of the crossbars to a wall thickness of the corresponding one of the crossbars is equal to or higher than 1.05.

11. The retainer of claim 9, wherein the maximum protruding amount is not less than 1 micrometer and not more than 50 micrometers.

12. The retainer of claim 1, wherein each of the first recessed surfaces and the second recessed surfaces has a depth such that a ratio of a width of a corresponding one of the crossbars to a wall thickness of the corresponding one of the crossbars is equal to or higher than 1.05.

13. The retainer of claim 12, wherein the maximum protruding amount is not less than 1 micrometer and not more than 50 micrometers.

14. The retainer of claim 1, wherein the maximum protruding amount is not less than 1 micrometer and not more than 50 micrometers.

15. A tapered roller bearing comprising:
an inner race having a raceway surface, a small flange, and a large flange; and
the retainer of claim 1,
wherein a radial gap is defined between a radially inner surface of the first annular portion and a radially outer surface of the small flange, the radial gap being 2% or less of an outer diameter of the small flange.

16. A retainer formed with pockets configured to each receive one of a plurality of tapered rollers, the retainer comprising:
a plurality of crossbars separating circumferentially adjacent pairs of the pockets from each other;
a first annular portion continuously connected to first axial ends of the crossbars; and
a second annular portion having an outer diameter larger than an outer diameter of the first annular portion, and continuously connected to second axial ends of the crossbars which are opposite from the first axial ends of the crossbars,
wherein the crossbars have guide surfaces configured to circumferentially contact corresponding ones of the tapered rollers,
wherein the first annular portion includes pocket end surfaces each configured to axially contact a respective one of the tapered rollers, and third recessed surfaces in the form of cutouts each axially recessed from a respective one of the pocket end surfaces,
wherein each of the third recessed surfaces is located at a circumferentially central portion between a respective circumferentially adjacent pair of the crossbars,
wherein the guide surfaces are smoothly convex in a longitudinal direction of the tapered rollers,
wherein each of the tapered rollers includes a rolling surface central portion located at a central portion of an entire length of a respective one of the tapered rollers, and having a straight generating line, and crowning portions each extending from an end of the rolling surface central portion such that a diameter of the crowning portion gradually decreases in a direction away from the end, and
wherein each of the guide surfaces has a protruding portion having a maximum protruding amount protruding toward the rolling surface central portion of a corresponding one of the tapered rollers, the protruding portion being shorter, in the longitudinal direction of the corresponding one of the tapered rollers, than the rolling surface central portion of the corresponding one of the tapered rollers.

17. The retainer of claim 16, wherein the crossbars have radially inner surfaces that lie in an imaginary conical surface, wherein the first annular portion has a straight portion flush with the radially inner surfaces of the crossbars, and a rounded corner surface bent in a radial direction from the straight portion, and wherein the third recessed surfaces have depths of 0.1 mm or over, and are located within the straight portion.

18. The retainer of claim 16, wherein the maximum protruding amount is not less than 1 micrometer and not more than 50 micrometers.

19. A tapered roller bearing comprising:

an inner race having a raceway surface, a small flange, and a large flange; and the retainer of claim 16, wherein a radial gap is defined between a radially inner surface of the first annular portion and a radially outer surface of the small flange, the radial gap being 2% or less of an outer diameter of the small flange.

20. A retainer formed with pockets configured to each receive one of a plurality of tapered rollers, the retainer comprising:

a plurality of crossbars separating circumferentially adjacent pairs of the pockets from each other;

a first annular portion continuously connected to first axial ends of the crossbars; and a second annular portion having an outer diameter larger than an outer diameter of the first annular portion, and continuously connected to second axial ends of the crossbars which are opposite from the first axial ends of the crossbars, wherein the crossbars have guide surfaces configured to circumferentially contact corresponding ones of the tapered rollers, wherein each of the guide surfaces is tapered and has a length which is not less than 5% and not more than 20% of an average diameter of a corresponding one of the tapered rollers, in a plane perpendicular to a center axis of the corresponding one of the tapered rollers, and wherein the guide surfaces are smoothly convex in a longitudinal direction of the tapered rollers.

* * * * *